(12) United States Patent
Dufort et al.

(10) Patent No.: US 11,599,312 B1
(45) Date of Patent: Mar. 7, 2023

(54) SYSTEM AND METHOD FOR SECURE DELIVERY OF PRINTED DOCUMENTS VIA MOBILE PRINT CENTER

(71) Applicant: Xerox Corporation, Norwalk, CT (US)

(72) Inventors: Ron Dufort, Rochester, NY (US); Kip L. Jugle, Bloomfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/480,915

(22) Filed: Sep. 21, 2021

(51) Int. Cl.
*G06F 3/12* (2006.01)
*G05D 1/12* (2006.01)
*G06Q 10/083* (2023.01)
*B60P 3/00* (2006.01)

(52) U.S. Cl.
CPC ............ *G06F 3/1222* (2013.01); *B60P 3/007* (2013.01); *G05D 1/12* (2013.01); *G06F 3/126* (2013.01); *G06F 3/1226* (2013.01); *G06F 3/1238* (2013.01); *G06F 3/1256* (2013.01); *G06F 3/1259* (2013.01); *G06F 3/1268* (2013.01); *G06F 3/1288* (2013.01); *G06Q 10/083* (2013.01)

(58) Field of Classification Search
None
See application file for complete search history.

(56) References Cited

U.S. PATENT DOCUMENTS

| | | | |
|---|---|---|---|
| 1,384,940 A | 7/1921 | Denison | |
| 2,644,423 A | 7/1953 | Bauer | |
| 3,227,077 A | 1/1966 | Farrer et al. | |
| 3,600,730 A | 8/1971 | Evans | |
| 3,762,867 A | 10/1973 | Crawford | |
| 4,308,716 A | 1/1982 | Bauer | |
| 6,189,989 B1 | 2/2001 | Hirabayashi et al. | |
| 6,328,078 B1 | 12/2001 | Wildeman et al. | |
| 7,302,308 B2 | 11/2007 | Kato et al. | |
| 8,234,654 B2 | 7/2012 | Green et al. | |
| 8,259,323 B2 | 9/2012 | Miwa | |
| 8,570,550 B2 | 10/2013 | Pothos et al. | |
| 9,201,619 B2 | 12/2015 | Gross et al. | |

(Continued)

FOREIGN PATENT DOCUMENTS

| | | |
|---|---|---|
| WO | 2017013651 A1 | 1/2017 |
| WO | 2017200473 A1 | 11/2017 |
| WO | 2017203524 A1 | 11/2017 |

OTHER PUBLICATIONS

The Mini Mobile Robotic Printer, Kickstarter, Feb. 26, 2020, available at https://www.kickstarter.com/projects/1686304142/the-mini-mobile-robotic-printer.

(Continued)

*Primary Examiner* — Thomas D Lee
(74) *Attorney, Agent, or Firm* — Fox Rothschild LLP

(57) ABSTRACT

A secure document printing and delivery management system includes one or more print delivery vehicles, each of which includes an onboard print device. When the system receives a print job from a requesting device, it will select a print delivery vehicle instruct the print delivery vehicle to navigate to a delivery location. Upon arrival at the delivery location, the system will detect and verify a security token presented by a recipient. In response to detecting and verifying the token, the system may print the document (if not already printed) and it will present the document to the recipient.

20 Claims, 6 Drawing Sheets

(56) References Cited

U.S. PATENT DOCUMENTS

| | | | |
|---|---|---|---|
| 10,552,105 | B2 | 2/2020 | Miyazaki et al. |
| 10,613,803 | B2 | 4/2020 | Wushour et al. |
| 10,827,092 | B1 | 11/2020 | Bier et al. |
| 2002/0059961 | A1 | 5/2002 | Corbiere |
| 2003/0135931 | A1 | 7/2003 | Shaw |
| 2007/0146780 | A1* | 6/2007 | Miwa ............... B42C 19/02 358/1.15 |
| 2011/0254896 | A1 | 10/2011 | Ferrarotti et al. |
| 2014/0293313 | A1* | 10/2014 | Kakapuri ........... G06F 3/1222 358/1.14 |
| 2017/0267347 | A1 | 9/2017 | Rinaldi et al. |
| 2018/0023225 | A1 | 1/2018 | Chamberlin et al. |
| 2018/0322717 | A1* | 11/2018 | Rephlo ............. G07C 9/257 |
| 2022/0043941 | A1* | 2/2022 | Luo ................. G06F 30/10 |

OTHER PUBLICATIONS

McGowan, M., The New Factory: Building a "Swarm" of Mobile, Autonomous Robts, University of Arkansas Research Frontiers, Feb. 28, 2019.

Boissonneault, T., NYU Tandon team developing mobile 3D printers that work as a team, AM Research, Oct. 4, 2019.

\* cited by examiner

SYSTEM AND METHOD FOR SECURE DELIVERY OF PRINTED DOCUMENTS VIA MOBILE PRINT CENTER

BACKGROUND

In today's business environment, many employees work remotely, away from a centralized office. Remote workers may operate in their private homes, in restaurants or coffee shops, in hotels or vacation rentals, or even while at the worksite of a customer, vendor or other business partner. Remote work may be temporary, or it may be a long-term arrangement. In each of these situations, workers may need to print documents for review, but they cannot use the print services that are commonly available in their offices. In some remote locations, print devices simply may not be available for the worker to use. In others, print devices may be available, but in order to send print jobs to those devices the remote workers must connect their work-issued computing device to a potentially-unsecure third party network, email documents to an external party, or otherwise risk exposing confidential business documents and systems to external viewers.

This document describes new methods and systems directed to solving the issues described above, and/or other problems.

SUMMARY

In various embodiments, a secure document printing and delivery management system includes a processor and a memory containing programming instructions that are configured to cause the processor to perform certain functions. The system will receive a print job from a requesting device via a wireless communications network. The print job will include document printing instructions, a delivery location, and a user identifier. When the system receives such a print job, the system will generate a set of instructions that are configured to: (i) select a print delivery vehicle that contains a print device; (ii) cause the print device to use the document printing instructions print a document; (iii) instruct the print delivery vehicle to navigate to the delivery location; and (iv) cause the document to be presented to a recipient in response to confirming that the following conditions are satisfied: (a) the print delivery vehicle has navigated to the location, and (b) the processor has detected and verified a security token that corresponds to the user identifier.

In some embodiments, the system may use a security level indicator of the print job to determine a security level for the print job. When the security level is a relatively lower security level, the system may permit the print device to print the document while the print delivery vehicle is navigating to the delivery location. When the security level is a relatively higher security level, the system may permit the print device to print the document only after both (a) the print delivery vehicle has reached the delivery location, and (b) the processor has detected and verified the security token that corresponds to the user identifier.

In some embodiments, if the system receives a print job that does not include complete document data to be printed in the document, the system may only cause the print device to print the document after both: (a) the print delivery vehicle has reached the delivery location; and (b) the processor or the print device has received the document data from the recipient. To accommodate such situations, the print delivery vehicle may include a user interface with a data transfer portal for receiving document data from a device of the recipient when the print job does not comprise complete document data.

In some embodiments, the system may be programmed to monitor progress of the print delivery vehicle as the vehicle navigates to the delivery location. When the system detects that the print delivery vehicle has experienced a service interruption before reaching the delivery location, the in response the system may select an alternate print delivery vehicle that contains an alternate print device, and it may instruct the alternate print delivery vehicle to navigate to the delivery location to print and deliver the print job.

In some embodiments, when selecting the print delivery vehicle, the system may select, from a fleet of candidate vehicles, a vehicle having equipment or one or more capabilities that will satisfy one or more parameters of the print job. If no single vehicle in the fleet has equipment or capabilities that will satisfy all parameters of the print job, then the system may select multiple vehicles from the fleet, instruct each of the selected vehicles to navigate to the delivery location, and distribute the print job among the selected multiple vehicles according to each selected vehicle's equipment or capabilities.

In some embodiments, if the system receives a disapproval of the document from the recipient, the system may cause the print device to re-print the document.

In some embodiments, after causing the document to be presented to the recipient, the system may receive a modification of the document from the recipient. If this happens, the system may cause a scanning device to scan the document with the modification to yield a modified document file. The system may then cause the modified document file to be transmitted to the recipient or to an external service.

In various embodiment, the system includes the print delivery vehicle. The vehicle may include a compartment that holds the print device. The vehicle also may include an output cabinet with an inward-facing door that faces an interior of the compartment and an external-facing door that faces outside of the compartment. The vehicle also may include a user interface that is configured to receive the security token from a user device operated by the recipient. The processor may be either onboard the print delivery vehicle or located in a remote print management server that is in communication with the print delivery vehicle.

BRIEF DESCRIPTION OF THE DRAWINGS

FIG. 2A is a flowchart of an example process for secure delivery of printed documents using print delivery vehicles, while

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

Figure 1:
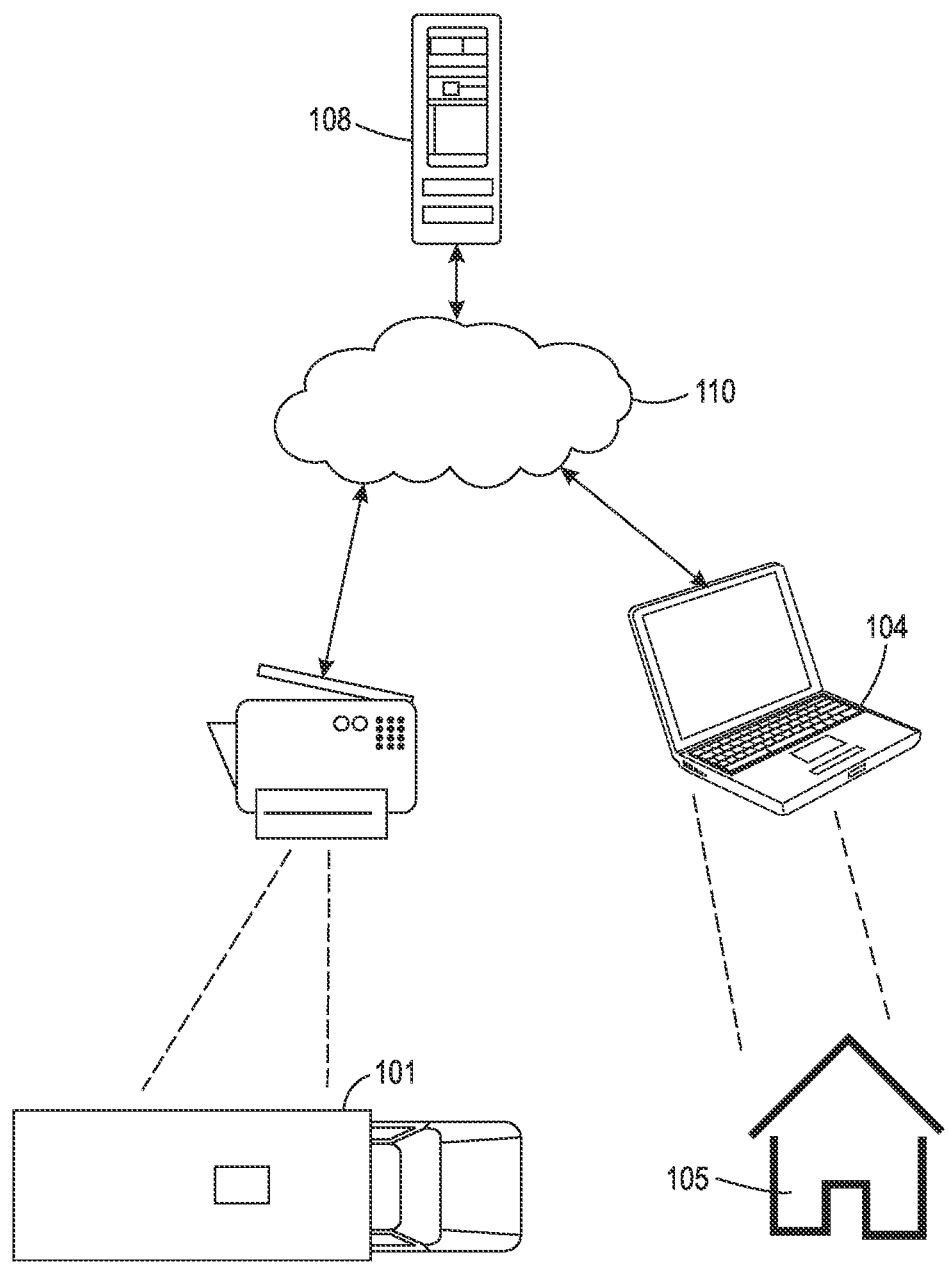
FIG. 1 is a schematic diagram of an example system for secure delivery of printed documents using print delivery vehicles.

Referring now to FIG. 1, a print system for secure delivery of printed documents using print delivery vehicles illustrated. As shown in FIG. 1, the print system includes at least one print delivery vehicle 101 (and typically a fleet that includes multiple print delivery vehicles) such as one or more vans or trucks, each of which contains and transports at least one print device 102. The print device 102 of each vehicle 101 includes or is in communication with a processor and a transceiver that provides a communication link to one or more communication networks 110 such as a local area network. The system also includes any number of user electronic devices 104 that are located at one or more device locations 105 such as homes, apartments, condominiums, hotels, or other locations. Each electronic device 104 is in communication with the one or more communication networks 110. The communication networks 110 provide a communication path to a print management server 108 that receives print job requests from users and coordinates delivery of completed print jobs to those users as described below.

Figure 2A:
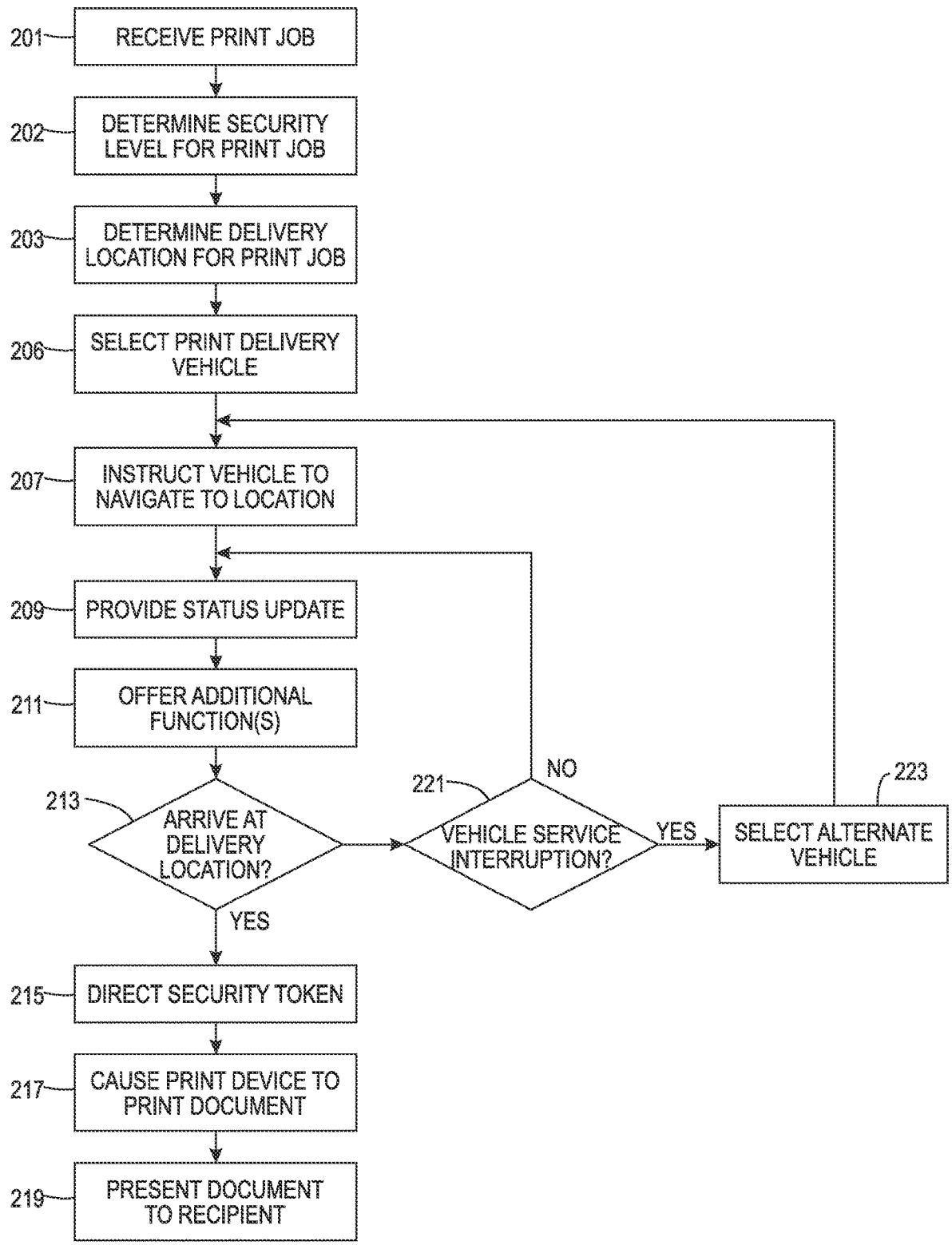
Figure 3:
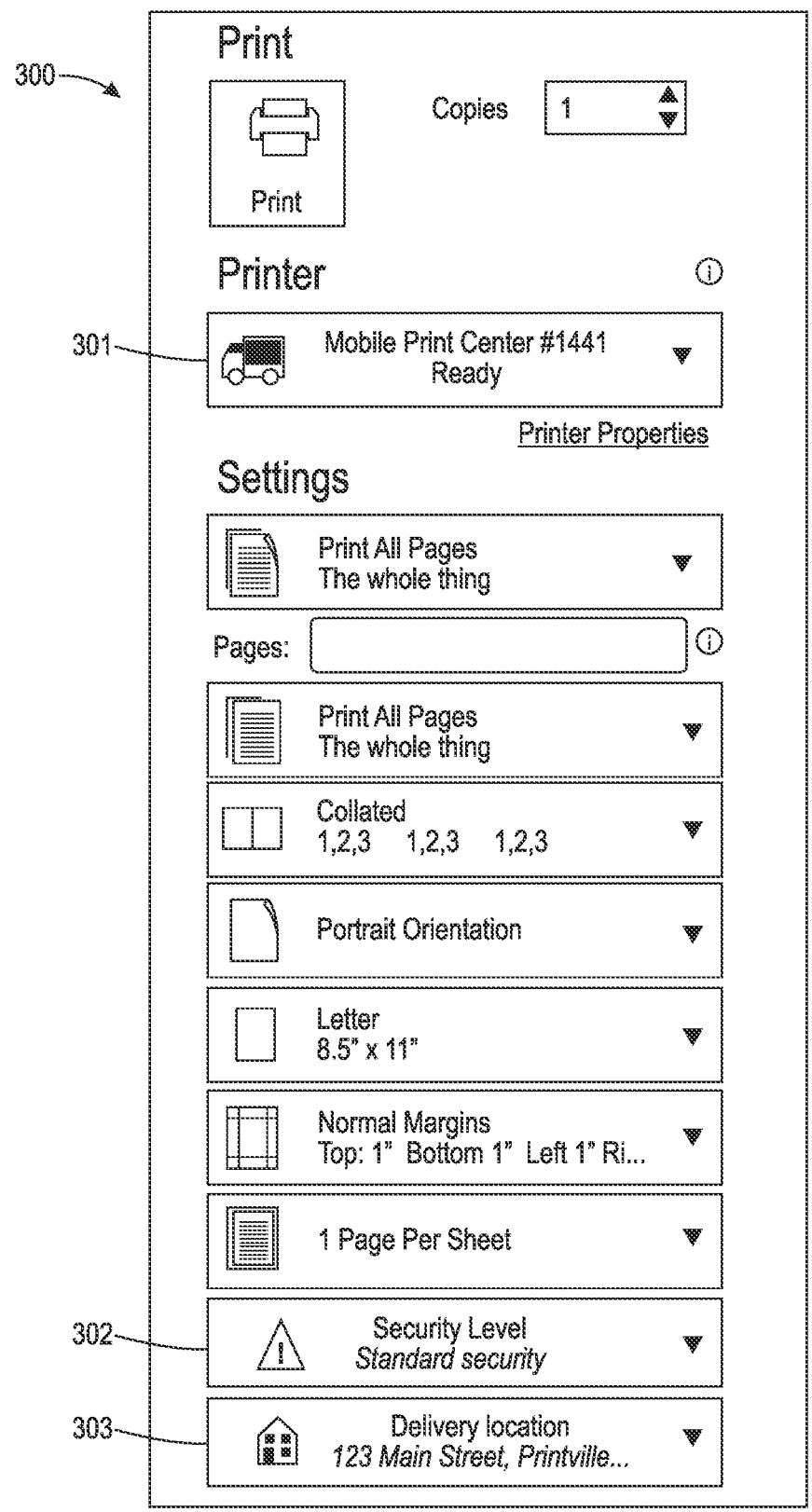
FIG. 3 is an illustration of an example user interface of a print job submission application.

FIG. 2A illustrates a process for secure document printing and delivery using the system components shown in FIG. 1. When a user submits a print job via an application on the user device, the print management server of the system receives the print job 201. For example, referring to FIG. 3, the print job submission application may include a user interface 300. When the user selects a mobile print center in a print device document selector 301, the application may send the print job to the print management server via a communication network. The print job will include one or more files containing instructions and data that are configured to cause a print device to print a document. The print job will also include information specifying a delivery location. The delivery location may be a location of the device that the user used to submit the print job request, as extracted from global positioning system (GPS) data of the user's device or otherwise determined. Optionally, the print job submission application user interface 300 may include a delivery location selector 303 that displays a default location and allows the user enter a command to change the default location to an alternate location. The default location may be determined by the application as a current location of the user device, as extracted from the device's GPS data or an identifier of the communications network with which the device is connected. Alternatively, the default location may be that stored in a user profile of the user who is using the device. Alternatively, the delivery location may be a location at which the user desires to receive (or to permit another user to receive) the document. In this case, the user may enter, and the system may receive, the alternate location via the delivery location selector 303 input field. The system may extract candidate alternate locations from the user's profile (such as previous delivery locations for the user) and display the alternate locations in a drop-down box or other field. In addition or alternatively, the delivery location selector 303 may include a field by which the user may enter an address of a delivery location.

The print job will also include a user identifier for a user (or user device) that is authorized to receive the document. The user identifier may be associated with the user who submitted the print job request, or the user identifier may be associated with another user whom the print job submitter specifies.

The system may also determine a security level for the print job at 202. For example, the print job also may include a security level indicator for the print job. For example, referring to FIG. 3, the print job submission application may include a user interface 300. When the user selects a mobile print center in a print device document selector 301, the interface may display a security selector 302 that permits the user to enter a security level from a menu of available security levels, such as high security, medium security or standard security. If the user does not select a security level, or if the system does not offer the user the ability to select a security level, the system may assign a security level to the document. For example, the system may assign a default security level (such as standard security) to the document, or it may access a look-up table or other data structure that associates default levels with document types, and the system may assign the security level that corresponds to the document type. Processes by which the system will use the identified security levels will be described below.

The print management server will use the delivery location to determine a location to deliver the print job's resulting document to the specified user at 203. To do this, the system may extract GPS coordinates or a street address from the print job request, and the system may access a map that includes the coordinates or address. The system will then select a print delivery vehicle at 205, and at 207 the system will generate a set of instructions that are configured to cause the print delivery vehicle to navigate to the location.

To implement steps 205 and 207, the system may have access to a fleet of print delivery vehicles that are candidate vehicles. Some of the systems may be assigned to different print delivery classes. For example, standard print delivery vehicles may include: (i) a battery or other power source; (ii) a network hub; and (iii) a print device of a first level of functionality such as a first print speed, a first print resolution, or a first set of print substrate types. Advanced print delivery vehicles may be equipped with: (i) a print device having a second (higher) level of functionality such as a second print speed or resolution that is higher than the first print speed or resolution; (ii) a second set of print substrate types that are rated more highly (or that are greater in number) than the first set of print substrate types; and/or (iii) additional functions not available in standard vehicles such as binding, coating or other finishing applications. Large-scale print delivery vehicles may be equipped with a third, even higher, level of functionality such as: (i) print devices with a third print speed or resolution that is higher than the second print speed or resolution; (ii) a second set of print substrate types that are rated more highly (or that are greater in number than) the second set of print substrate types; a (iii) greater number of print devices than the standard or advanced print delivery vehicles carry; and/or (iv) additional functions that can serve larger-scale and/or longer-term printing such as may be required at conferences, music or film festivals, emergency response events and the like. Large-scale print delivery vehicles may include their own power sources and/or be configured to connect to an external power source such as a generator.

To select an appropriate vehicle from a fleet of print delivery vehicles to serve the print job, the system may use an algorithm that considers whether the print delivery vehicle has equipment or capabilities that will satisfy one or more parameters of the print job such as:

the print delivery vehicle must be stocked with and equipped to print on a size, type or number of sheets of substrate specified in the print job;

the print delivery vehicle must be equipped with devices capable of performing all functions specified in the print job such as stapling, binding, or other finishing functions;

the vehicle must be stocked with a sufficient amount of print consumables (paper, ink or toner, etc.) to complete the print job;

the vehicle must be within a specified proximate distance of and/or estimated arrival time to the delivery location;

the vehicle must be equipped with security features that satisfy one or more conditions the assigned security level; and/or the vehicle must be the one in the fleet that can serve the print job to the delivery location most quickly.

For example, if only one print delivery vehicle in the fleet is equipped to handle the request, the system may send a command at 207 to that vehicle to dispatch it to the delivery location. If multiple print delivery vehicles are equipped with capabilities to handle the request, the system may determine which vehicle can reach the delivery location most quickly by sending an application programming interface (API) call to, or otherwise accessing, an internal or external mapping system to retrieve a route and an estimated travel time for each candidate vehicle to the delivery location. (For any candidate vehicles that already have other print jobs in their queue, the route and travel time also may include any intermediate delivery locations for the queued print jobs.) The command at 207, along with navigation directions, may be output on a display device and/or audio output that a vehicle operator can use to navigate to the delivery location. Alternatively, if the vehicle is an autonomous vehicle, the command at 207 may include instructions capable of causing the vehicle's motion planning system to plan and follow a path to the delivery location.

Optionally, if the system determines that no single print delivery vehicle is equipped to handle the requirements of the print job, the system may select multiple vehicles at 206 and instruct each of the selected vehicles to navigate to the delivery location at 207. The system may then distribute the print job among the selected vehicles according to each vehicle's equipment and capabilities. For example, if one vehicle has enough paper stocked to complete 50% of a print job and a second vehicle has enough paper stocked to complete at least 50% of the print job, the system may assign 50% of the print job to each of the two vehicles. The system may then present the document to the recipient when (a) both vehicles have reached the delivery location, and (b) the recipient has presented the security token to one (in some options) or both (in other options) of the vehicles.

In some embodiments, before instructing the selected vehicle to navigate to the location, the system may require that the user who submitted the print job request provide an advance payment for the print job. The advance payment may be received in the form of a credit or debit card authorization that the user enters into his/her print management application, into a point of sale (POS) terminal or other transaction card reader, or by extracting payment tokens or a transaction card authorization from a digital wallet. In other situations, if the user is an employee or other authorized user that is affiliated with an organization that pays for the service, the system may send a payment processing request to a payment processing system with which the organization has an account. In either case, the print job management system may perform these operations, or the print job management system may send a service message to a transaction processing system to handle the payment.

Optionally, as the selected print delivery vehicle navigates to the location, the system may monitor the vehicle's progress using a GPS tracking device and an internal or external mapping system, and at 209 the system may transmit status updates to the recipient's electronic device as the vehicle approaches the delivery location. Status updates may include information such as the current location of the print delivery vehicle and an anticipated arrival time for the print delivery vehicle at the delivery location.

In some situations, while monitoring the vehicle's progress, the system may identify a vehicle service interruption (step 221). A vehicle service interruption is a situation in which the vehicle's progress has been delayed or impeded due to, for example, a vehicle equipment malfunction or other maintenance problem, traffic disruptions or other actions. The system may identify a vehicle service interruption by receiving a communication from a vehicle operator that identifies the interruption, by receiving a signal from an onboard diagnostics system of the vehicle, or by monitoring the vehicle's transit and determining that the vehicle's estimated arrival time has been delayed by more than a threshold amount. If the system confirms the service interruption at 221, it may select an alternate vehicle at 223 to provide the print job to the delivery location using a selection process such as that described above for step 205, and the system will then instruct the alternate vehicle to navigate to the delivery location as in step 207.

Optionally, as the selected print delivery vehicle navigates to the location, at 211 the system may also transmit one or additional print function offers to the recipient's electronic device. To do this, the system may access a vehicle feature data set and extract, from the data set, one or more features that the selected print delivery vehicle is equipped to perform but that are not included in the print job, such as color printing, additional copies, or finishing tasks such as binding or stapling. If the system identifies such additional functions, it may transmit descriptions of those additional functions to the recipient's electronic device. If the user replies with a selection of any of the additional functions, the system may add the selected additional functions to the print job before the vehicle reaches the delivery location.

Ultimately, the system may cause the print delivery vehicle to use one or more of its print devices to execute the print job and print the document at 217 and present the print job's document to the recipient at 219. However, before doing either or both of these actions, the system may require verification that (a) the print delivery vehicle has arrived at the delivery location (step 213) and (b) the system has detected a security token that the recipient has presented (step 215). Depending on system configuration, a selected security level and/or one or more rule sets, the system may print the print job either before or after steps 213 and/or 215, but it will not present the print job to the recipient at 219 until the recipient presents and the system verifies the security token at 215.

Optionally, if the print job includes or has been assigned a high or medium security level identifier, it may not permit the print device to execute the print job (step 217) until the system receives the security token from the recipient at the delivery location. In addition, different security levels may require the system to implement certain document handling conditions. For example:

A document file for a print job that has a high security level may never be handled by anyone other than the designated recipient. In this situation the print job that the system initially receives may include instructions for printing the document, but not the actual document data that is to be printed. Instead, the system will receive the document in one or more files from a user at the delivery location. The system may require the recipient to present its token directly to the print device, and the document data may never be stored in the network. The print device will only execute the print job and print the document in response to: (a) receiving and verifying the security token; and (b) receiving the document data from the user, either as a file from a memory device presented by the user (such as a flash memory device) or in a hard copy of the document is to be scanned. The system may access the document file only for the limited time and purpose required to complete the document. After printing the document, the system may delete any stored electronic copies of the print job and document that it may have held. If the system scanned the document, it may transfer the scanned document file to a memory device that the verified user presents.

A print job that has a medium security level may never be handled in hard copy form by anyone other than the designated recipient, but the system may retain a copy of the electronic document file in a memory. The system may require the recipient to present its token directly to the print device. The print device will only execute the print job and print the document in response to receiving and verifying the security token. In some embodiments, the document file may be retained in a cloud storage device and not transferred to the print device until the user presents the security token. Optionally, upon completion of the print job, the system may delete any stored electronic copies of the document that it may have held, optionally after transferring the files to a memory device that the authorized recipient presents (such as a flash drive).

A print job that has a standard security level may be executed before reaching the customer. The system may use a standard security level as a default unless a higher security level is selected for a particular job, in order to print documents before arrival and thus reduce drop-off and delivery time in situations where higher security is not required.

In addition, print job files that are associated with certain security identifiers may be encrypted, security tokens may include an encryption key, and the print device and/or onboard vehicle processors may only be able to decrypt the print job files upon receipt of the security token with encryption key. However, if the print job does not include a security identifier, the system may permit the print device to execute the print job while the vehicle is traveling to the delivery location, before receiving the security token.

To confirm that the print delivery vehicle has arrived at the delivery location (step 213), as noted above the system may monitor the vehicle's progress using a GPS tracking device and compare the vehicle's GPS coordinates to map data of an internal or external mapping system. When the GPS coordinates match or within a proximate distance of the coordinates of delivery location, the system may determine that the vehicle has arrived at the delivery location. Alternatively or in addition, the system may wait for a driver of the vehicle to enter an arrival confirmation into a user interface of an electronic device that is in the vehicle.

To confirm that the print delivery vehicle has detected and verified a security token from the recipient (step 215), the system may include a token reading device such as a Bluetooth or near-field communication (NFC)-enabled receiver that receives the token from the user's electronic device and/or a smart card device when the user's device is within communication range of and paired with (or otherwise transmitting data to) the token reader. The token reading device also may include a transaction card reader such as those available in point-of-sale terminals, and the user may present an identification card or transaction card to the card reader as a component of the token. In some embodiments, a processor of the print device or otherwise within the print delivery vehicle may verify the token; in other embodiments the print delivery vehicle may transfer the security token to an external print management server for verification. In any of these situations, verification of the token must occur when the vehicle is at the delivery location. If the token has not been presented to the system while the print delivery vehicle is at the delivery location, the system will not permit the document to be presented to the user. In some cases (such as those involving high or medium security level documents as described above) the system may not even print the print job until the user presents the token to the print delivery vehicle at the delivery location.

Figure 2B:
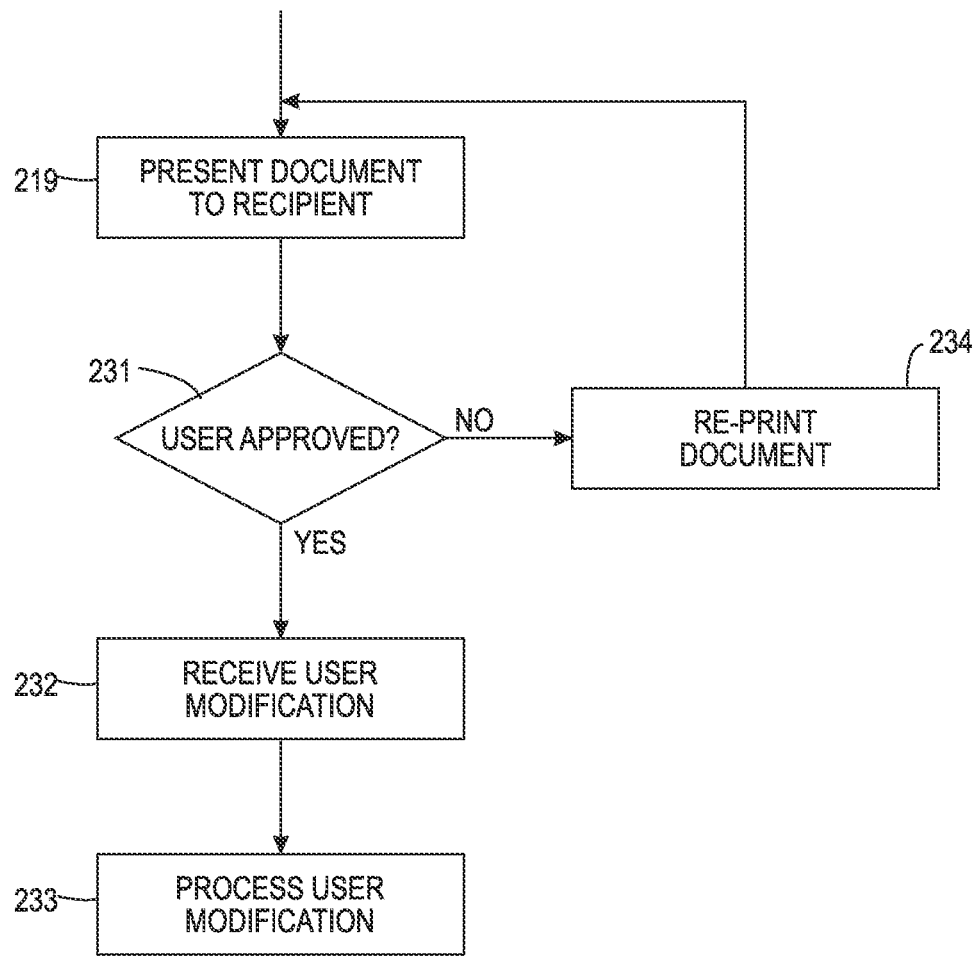
FIG. 2B illustrates additional steps of the process that may occur after the system delivers a printed document to a recipient.

FIG. 2B illustrates additional steps that may occur upon and after presentation of the document to the recipient at 219. For example, the print delivery vehicle may wait at the delivery location for a period of time for the user to inspect the document and approve the print job performance at 231. The user may indicate approval (or disapproval) by entering an indicator of such into the application on the user's device, into a user interface of the print device or other equipment onboard the vehicle, or otherwise. If the user indicates approval (231: YES), or if the user does not disapprove the print job before a time limit has expired, the system may consider the print job to be complete. However, if the user indicates disapproval (231: NO), the system may cause the print device to re-print the document at 234 and present the re-printed document to the recipient for review and inspection at this time.

In addition, some documents may be generated for the purpose of user modification, such as tests, surveys, employment documents, government-issued forms, and the like. When the system receives a user's modification of the document at 232, the system may process the user modification at 233. Example processing steps include; (a) a scanning device onboard the vehicle scanning the document and transmitting a data file of the scanned document to an external service; (b) a scanning device onboard the vehicle scanning the document, using optical character recognition to extract text from the document, generating a data file with the scanned text, and performing an action on the data file such as transferring it to an automated translation application for translation to a different language and/or transmitting it to an external server or to the user. The scanning device that performs these functions may be the print device if the print device is a multi-function device, or a separate device such as a camera.

Figure 4:
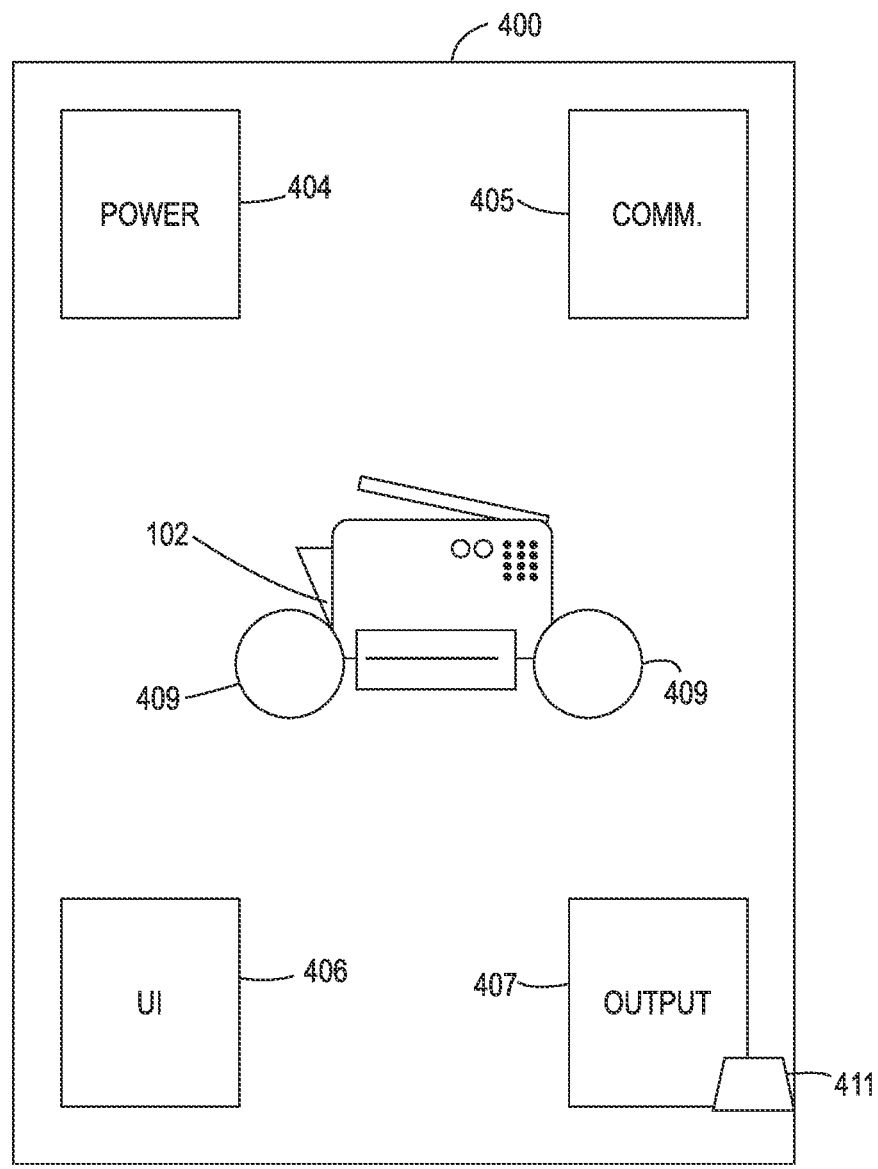
FIG. 4 is a block diagram illustrating various components of a possible print delivery vehicle.

Referring now to FIG. 4, a schematic representation of various components of an example print delivery vehicle 101 is shown. As previously shown in FIG. 1, the vehicle 101 will include a cabin, trailer, or other compartment 400 that holds one or more print devices 102. The print devices may be secured by a one or more damper structures 409 such as foam, rubber, or other resilient materials that can help reduce the impact that vehicle vibration will have on print operations. The vehicle will include one or more power sources 404, such as one or more batteries, solar panels or generators. Optionally, the batteries may be electrically connected to an alternator that recharges the batteries by generating current from vehicle motion), Each print device 102 will be electrically connected to a power source 404 to receive power for operation. Each print device 102 also will be communicatively connected to a communication network hub 405 with one or more transceivers to provide a communication link with one or more external communication networks.

The compartment 400 may include an internal-facing or external-facing user interface 406 such as a display device, keyboard or keypad, audio speaker or other device via which the user may enter information such as print job instructions or user credentials. The user interface 406 also may include a camera that can capture images of the user or the user's device, and/or a receiver that can receive communications from the user's device, in order to receive and verify the user's security credential. The user interface 406 also may include a data input portal and/or communication receiver via which the user may transfer document data to the system, if the document data was not included in the print job. The compartment 400 also may include an internal-facing or external-facing output cabinet 407 for presenting completed documents to the user, receiving documents to be scanned from a user, or both. The output cabinet 407 may be any suitable structure such as a box, a drawer, a tray or other structure of sufficient size to hold documents that are being transferred from the compartment 400 to an external user and vice versa. For example, the output cabinet 407 may have a first door facing inward to the vehicle compartment, and a second door facing outward from the department. The user may use the outward-facing door to receive documents from the cabinet 407, or to place documents to be scanned or otherwise handled in the cabinet 407. A vehicle operator may use the inward-facing door to place printed documents in the output cabinet 407 and/or receive documents that a user has placed in the output cabinet 407. Optionally, the external-facing door may include a lock 411 that will secure the external-facing door until the system has verified the user's security token. Upon verification of the user's security token, the system may release the lock 411 and unlock the external-facing door for a limited period of time to allow the user to access the cabinet 407 and retrieve the printed documents.

Figure 5:
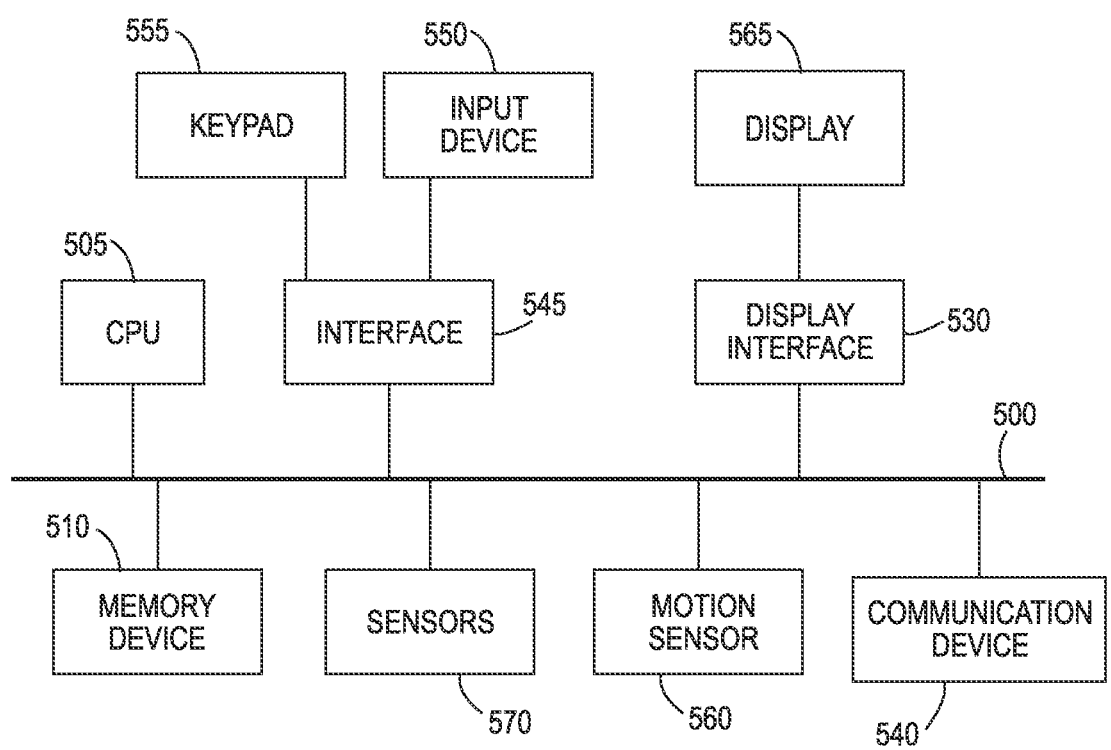
FIG. 5 illustrates an example of internal hardware that may be used to contain or implement the various electronic devices described in this document.

FIG. 5 depicts a block diagram of hardware that may be used to contain and/or implement program instructions, such as those of a cloud-based server, electronic device, virtual machine, or container. Some or all of the components of FIG. 5 may be included in a print device or a drone described above. A bus 500 serves as an information highway interconnecting the other illustrated components of the hardware. The bus may be a physical connection between elements of the system, or a wired or wireless communication system via which various elements of the system share data. Processor 505 is a processing device of the, performing calculations and logic operations required to execute a program. Processor 505, alone or in conjunction with one or more of the other elements disclosed in FIG. 5, is an example of a processing device, computing device or processor as such terms are used within this disclosure. The processing device may be a physical processing device, a virtual device contained within another processing device, or a container included within a processing device.

A memory device 510 is a hardware element or segment of a hardware element on which programming instructions, data, or both may be stored. Read only memory (ROM) and random access memory (RAM) constitute examples of memory devices, along with cloud storage services.

An optional display interface 530 may permit information to be displayed on the display 565 in audio, visual, graphic or alphanumeric format. Communication with external devices, such as a printing device, may occur using various communication devices 540, such as a communication port or antenna. A communication device 540 may be communicatively connected to a communication network, such as the Internet or an intranet.

The hardware may also include a user input interface 545 which allows for receipt of data from input devices 550 such as a keyboard or keypad 555, a mouse, a touch pad, a touch screen, a remote control, a pointing device, a video input device and/or a microphone. Data also may be received from an image capturing device 520 such as a digital camera or video camera.

Various sensors such as a positional sensor and/or motion sensor 560 and associated programming may be included to detect position and movement of the electronic device. Examples of motion sensors include gyroscopes or accelerometers. Examples of positional sensors such as a global positioning system (GPS) sensor device that receives positional data from an external GPS network. Other types of sensors 570 (e.g., vibration sensors) may also be included.

Terminology that is relevant to this disclosure includes:

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, laptop computers, digital display devices, print devices, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, print devices, connected light bulbs and other devices. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 4.

A "document" refers to a digital representation of a document such as a word processor file, an electronic presentation file, an electronic spreadsheet, a PDF file, or a bitmap file (e.g. TIFF, JPG, PNG files etc.) that is stored in a computer readable memory or a storage medium. A document file may be an electronic representation of a physical document that contains one or multiple pages. A document may also refer to the set of instructions or metadata that cause the document to be processed.

The term "print device" refers to a machine having hardware capable of reading a digital document file and use the information from the file and associated print instructions to print of a physical document on a substrate. Components of a print device typically include a print engine, which includes print hardware such as a print head, which may include components such as a print cartridge containing ink, toner or another print material, as well as a document feeding system configured to pass a substrate through the print device so that the print head can print characters and/or images on the substrate. In some embodiments, a print device may have additional capabilities such as scanning or faxing and thus may be a multifunction device ("MFD").

The term "print job" refers to a set of digital data that represents text, images and/or other content that a print device will print on a substrate.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

A "server" is an electronic device containing one or more processors and memory devices, and which are used to distribute data, instructions or both to one or more external computing devices via one or more communication paths.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

The features and functions described above, as well as alternatives, may be combined into many other systems or applications. Various presently unforeseen or unanticipated alternatives, modifications, variations or improvements may be made by those skilled in the art, each of which is also intended to be encompassed by the disclosed embodiments.

The invention claimed is:

1. A secure document printing and delivery management system comprising:
 a processor and a memory containing programming instructions that are configured to cause the processor to, in response to receiving a print job from a requesting device via a wireless communications network, wherein the print job comprises document printing instructions, a delivery location, and a user identifier:
  generate a set of instructions that are configured to:
   select a print delivery vehicle that contains a print device;
   cause the print device to use the document printing instructions to print a document;
   instruct the print delivery vehicle to navigate to the delivery location; and
   cause the document to be presented to a recipient in response to confirming that the following conditions are satisfied:
    the print delivery vehicle has navigated to the location, and
    the processor has detected and verified a security token that corresponds to the user identifier;
  wherein the instructions to cause the print device to use the document printing instructions to print a document comprise programming instructions that are configured to cause the processor to:
   use a security level indicator of the print job to determine a security level for the print job; and
   either:
    in response to the security level being a first security level, causing the print device to print the document while the print delivery vehicle is navigating to the delivery location, or
    in response to the security level being a second security level that is higher than the first security level, causing the print device to print the document only after both (a) the print delivery vehicle has reached the delivery location, and (b) the processor has detected and verified the security token that corresponds to the user identifier.

2. The system of claim 1, further comprising additional programming instructions that are configured to cause the processor to:
 in response to a security level for the print job being a high security level, hold the print job and only deliver a document file of the print job to the print device after both:
  (a) the print delivery vehicle has reached the delivery location, and
  (b) the processor has detected and verified the security token that corresponds to the user identifier.

3. The system of claim 1, further comprising additional programming instructions that are configured to cause the processor to:
 in response to the print job not including document data to be printed in the document, and only cause the print device to print the document after both:
  (a) the print delivery vehicle has reached the delivery location, and
  (b) the processor or the print device has received the document data from the recipient.

4. The system of claim 3, further comprising the print delivery vehicle, wherein the print delivery vehicle comprises:
 a user interface with a data transfer portal for receiving the document data from a device of the recipient when the print job does not comprise the document data; and
 an external-facing door that faces outside of the compartment.

5. The system of claim 1, further comprising additional programming instructions that are configured to cause the processor to:
 monitor progress of the print delivery vehicle as the vehicle navigates to the delivery location; and
 in response to detecting that the print delivery vehicle has experienced a service interruption before reaching the delivery location:
  select an alternate print delivery vehicle that contains an alternate print device, and instruct the alternate print delivery vehicle to navigate to the delivery location to print and deliver the print job.

6. The system of claim 1, wherein the programming instructions that are configured to cause the processor to select the print delivery vehicle comprise instructions to select, from a fleet of candidate vehicles, a vehicle having equipment or one or more capabilities that will satisfy one or more parameters of the print job.

7. The system of claim 6, wherein the programming instructions that are configured to cause the processor to select the print delivery vehicle comprise instructions to:
in response to determining that no single vehicle in the fleet has equipment or capabilities that will satisfy all parameters of the print job:
select multiple vehicles from the fleet,
instruct each of the selected vehicles to navigate to the delivery location, and
distribute the print job among the selected multiple vehicles according to each selected vehicle's equipment or capabilities.

8. The system of claim 1 further comprising additional instructions to, after causing the document to be presented to the recipient:
in response to receiving a disapproval of the document from the recipient, causing the print device to re-print the document.

9. The system of claim 1 further comprising additional instructions to, after causing the document to be presented to the recipient:
receiving a modification of the document from the recipient;
causing a scanning device to scan the document with the modification to yield a modified document file; and
causing the modified document file to be transmitted to the recipient or to an external service.

10. The system of claim 1, further comprising the print delivery vehicle, wherein the vehicle comprises:
a compartment that holds the print device; and
an output cabinet with an inward-facing door that faces an interior of the compartment and an external-facing door that faces outside of the compartment.

11. The system of claim 1, further comprising the print delivery vehicle, wherein the print delivery vehicle comprises:
a compartment that holds the print device; and
a user interface that is configured to receive the security token from a user device operated by the recipient.

12. The system of claim 1, wherein the processor is either onboard the print delivery vehicle or located in a remote print management server that is in communication with the print delivery vehicle.

13. A method of printing and delivering a document, the method comprising:
by a processor, in response to receiving a print job from a requesting device via a wireless communications network, wherein the print job comprises document printing instructions for printing a document, a delivery location, and a user identifier:
generating a set of instructions that are configured to:
select a print delivery vehicle that contains a print device;
cause the print device to print the document;
instruct the print delivery vehicle to navigate to the delivery location; and
cause the document to be presented to a recipient in response to confirming that the following conditions are satisfied:
the print delivery vehicle has navigated to the location, and
the processor has detected and verified a security token that corresponds to the user identifier;
wherein the instructions to cause the print device to use the document printing instructions to print a document comprise programming instructions that are configured to cause the processor to:
use a security level indicator of the print job to determine a security level for the print job; and
either:
in response to the security level being a first security level, causing the print device to print the document while the print delivery vehicle is navigating to the delivery location, or
in response to the security level being a second security level that is higher than the first security level, causing the print device to print the document only after both (a) the print delivery vehicle has reached the delivery location, and (b) the processor has detected and verified the security token that corresponds to the user identifier.

14. The method of claim 13 further comprising, by the processor:
in response to a security level for the print job being a high security level, holding the print job and only delivering a document file of the print job to the print device after both:
(a) the print delivery vehicle has reached the delivery location, and
(b) the processor has detected and verified the security token that corresponds to the user identifier.

15. The method of claim 13 further comprising, by the processor, in response to the print job not including document data to be printed in the document:
receiving the document data via a data transfer portal of the print delivery vehicle when the vehicle is at the location; and
only causing the print device to print the document after the document data has been received via the data transfer portal at the location.

16. The method of claim 13 further comprising, by the processor:
monitoring progress of the print delivery vehicle as the vehicle navigates to the delivery location; and
in response to detecting that the print delivery vehicle has experienced a service interruption before reaching the delivery location:
selecting an alternate print delivery vehicle that contains an alternate print device, and
instructing the alternate print delivery vehicle to navigate to the delivery location to print and deliver the print job.

17. The method of claim 13, wherein selecting the print delivery vehicle comprises:
seeking, from a fleet of candidate vehicles, a vehicle having equipment or one or more capabilities that will satisfy one or more parameters of the print job; and
in response to determining that no single vehicle in the fleet has equipment or capabilities that will satisfy all parameters of the print job:
selecting multiple vehicles from the fleet, instructing each of the selected vehicles to navigate to the delivery location, and distributing the print job among the selected multiple vehicles according to each selected vehicle's equipment or capabilities.

18. The method of claim 13 further comprising, after causing the document to be presented to the recipient:

receiving a modification of the document from the recipient;

causing a scanning device to scan the document with the modification to yield a modified document file; and causing the modified document file to be transmitted to the recipient or to an external service.

19. A secure document printing and delivery management system comprising:

a processor and a memory containing programming instructions that are configured to cause the processor to, in response to receiving a print job from a requesting device via a wireless communications network, wherein the print job comprises document printing instructions, a delivery location, and a user identifier: generate a set of instructions that are configured to:

select a print delivery vehicle that contains a print device;

cause the print device to use the document printing instructions to print a document;

instruct the print delivery vehicle to navigate to the delivery location; and cause the document to be presented to a recipient in response to confirming that the following conditions are satisfied:

the print delivery vehicle has navigated to the location, and the processor has detected and verified a security token that corresponds to the user identifier, and after causing the document to be presented to the recipient:

in response to receiving a disapproval of the document from the recipient, causing the print device to re-print the document.

20. A secure document printing and delivery management system comprising:

a processor and a memory containing programming instructions that are configured to cause the processor to, in response to receiving a print job from a requesting device via a wireless communications network, wherein the print job comprises document printing instructions, a delivery location, and a user identifier: generate a set of instructions that are configured to:

select a print delivery vehicle that contains a print device;

cause the print device to use the document printing instructions to print a document;

instruct the print delivery vehicle to navigate to the delivery location; and cause the document to be presented to a recipient in response to confirming that the following conditions are satisfied:

the print delivery vehicle has navigated to the location, and the processor has detected and verified a security token that corresponds to the user identifier, and after causing the document to be presented to the recipient:

receiving a modification of the document from the recipient, causing a scanning device to scan the document with the modification to yield a modified document file, and causing the modified document file to be transmitted to the recipient or to an external service.

* * * * *